United States Patent [19]

Daniels et al.

[11] 3,720,415

[45] March 13, 1973

[54] DISC DRIVE

[75] Inventors: Charles J. Daniels, Terminal Island; Harvey W. La Branche, Palos Verdes Peninsula, both of Calif.

[73] Assignee: Mattel, Inc., Hawthorne, Calif.

[22] Filed: June 8, 1970

[21] Appl. No.: 44,349

[52] U.S. Cl. ....................274/39 A

[51] Int. Cl. ....................G11b 3/00

[58] Field of Search ....................274/39, 9, 41 R, 41.6, 5; 179/100.3

[56] References Cited

UNITED STATES PATENTS

| | | | |
|---|---|---|---|
| 2,988,365 | 6/1961 | Favaro | 274/9 R |
| 1,766,046 | 6/1930 | Prescott et al. | 274/41.6 R |
| 2,092,892 | 9/1937 | Runge | 274/41.6 R |

FOREIGN PATENTS OR APPLICATIONS

| | | | |
|---|---|---|---|
| 494,987 | 8/1950 | Belgium | 274/9 R |
| 284,132 | 11/1952 | Switzerland | 274/9 R |

*Primary Examiner*—Harry N. Haroian
*Attorney*—Seymour A. Scholnick

[57] ABSTRACT

Apparatus for driving optical disc while light passes through it to photocells, in a manner that reduces noise to a minimum, by eliminating the need for a transparent turntable to support the disc. The apparatus includes a stationary plate of electrically conductive material with protuberances thereon which support the disc as it is rotated by a motor, the protuberances having a small area in contact with the disc to minimize the area over which static electricity can accumulate that tends to make the disc stick to the plate.

6 Claims, 3 Drawing Figures

INVENTORS
CHARLES J. DANIELS
HARVEY W. LA BRANCHE

BY

ATTORNEY

DISC DRIVE

BACKGROUND OF THE INVENTION

The background of the invention will be set forth in two parts.

1. Field of the Invention

This invention relates to apparatus for driving a disc, and while not limited thereto, is particularly directed to a machine for driving an optical disc.

2. Description of the Prior Art

One type of organ generates tones and other musical sounds by employing an optical disc with many concentric tracks that define different sounds. Each track is formed by a pair of opaque border lines which define a transparent line of variable width that extends in a circle around the record. Beams of light shining through the tracks fall on photocells that generate electrical signals. One way of rotating the optical disc is to provide a transparent turntable to support and rotate the disc, but scratches and other imperfections in the turntable add noise to the recorded musical sound.

OBJECTS AND SUMMARY OF THE INVENTION

An object of the present invention is to provide apparatus for driving an optical disc with information recorded thereon which is read out by passing light through the disc, in a manner that produces a minimum of noise.

Another object is to provide apparatus for supporting a rotating disc in a manner that produces a minimum of drag.

In accordance with one embodiment of the invention, an optical disc driving system is provided for shining beams of light through an optical disc while rotating it, in a manner that eliminates the need for a transparent turntable. The apparatus includes a disc-supporting member for directly supporting the disc wherein the supporting member remains stationary while the disc rotates on it. The apparatus also includes a light source on one side of the position occupied by the disc to shine beams of light through it, photodetectors on a side of the disc opposite the light source, and a motor driven wheel for rotating the disc while it is supported on the disc-supporting member. The disc supporting member is an electrically conductive plate with upwardly extending protuberances on which the disc rests. The protuberances minimize the area of contact between the disc and conductive plate, so that the build-up of static electricity which tends to make the disc stick to the plate, operates over only a small effective area. The protuberances are arranged in two or more concentric circles so that a minimum area of the disc rubs against the protuberances, to minimize the amount of static electricity or charge which is generated.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
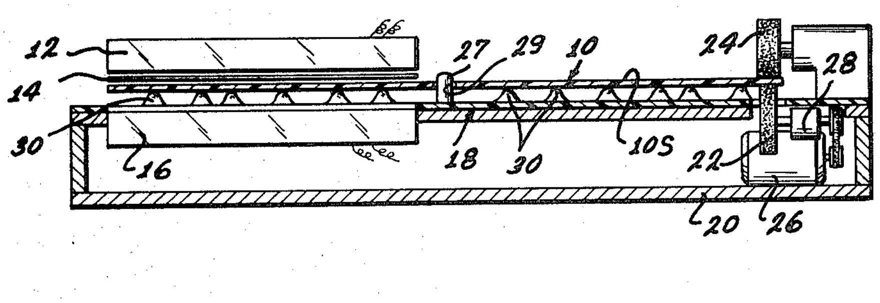
FIG. 1 is a sectional view of an optical disc playing machine constructed in accordance with one embodiment of the invention.
Figure 2:
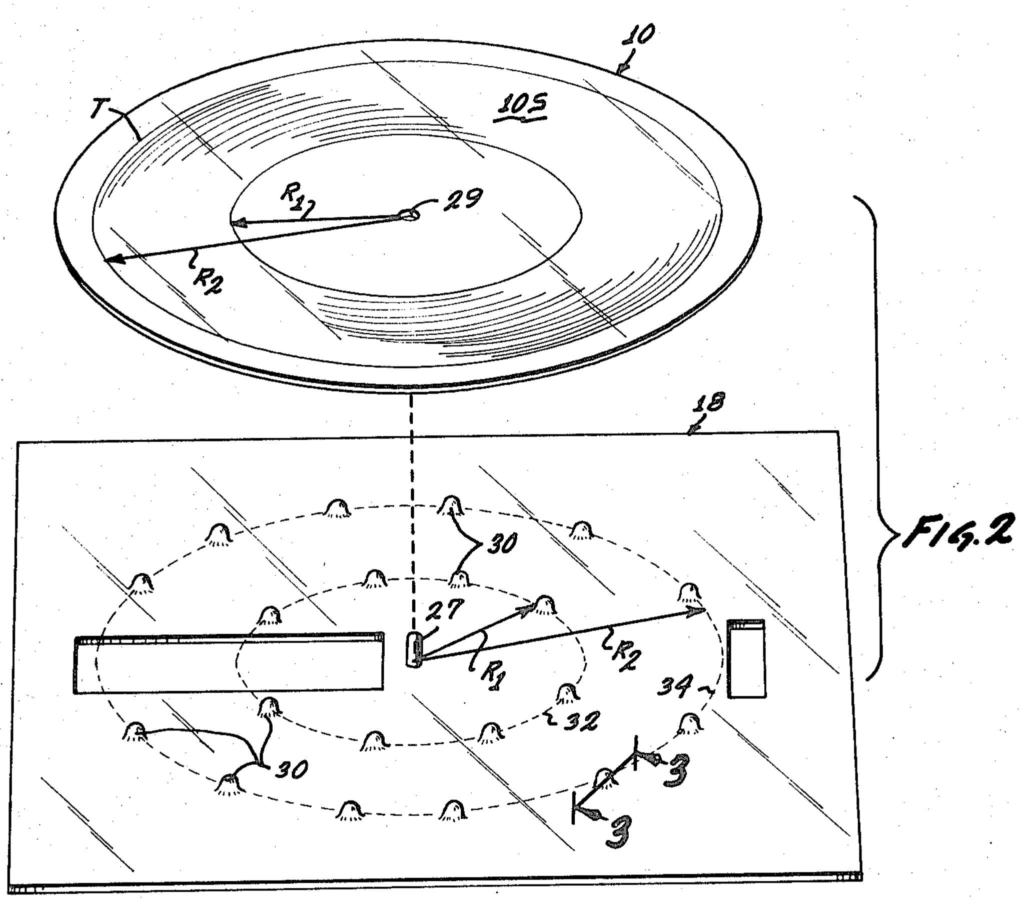
FIG. 2 is a perspective view of the disc and disc-supporting plate of the apparatus of FIG. 1.
Figure 3:
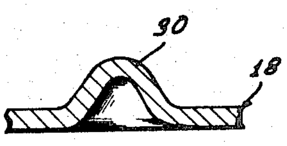
FIG. 3 is a view taken on the line 3—3 of FIG. 2.

The figures illustrate apparatus for driving an optical disc 10 formed of clear plastic with a photographic emulsion on its upper surface 10S. The photographic emulsion has been exposed and developed so that it forms several dozen concentric optical tracks, each track formed by opaque border lines that define a transparent line of variable width. The optical disc 10 must be rotated at a constant rate such as one revolution every two seconds while light shines through the tracks. A light source 12 shines beams of light that pass through a slit 14 and through transparent track areas of the disc to a group of photocells 16 whose electrical output can be amplified and delivered to a loudspeaker. If the optical disc 10 were mounted on a transparent turntable, then scratches and other imperfections in the turntable would add noise to outputs from the photocells. To avoid this source of noise, the disc is supported by a plate 18 that is mounted on a housing 20 in a stationary manner, so that the plate remains substantially stationary as the disc rotates on it. The disc is rotated by a drive roller 22 that bears against the bottom of the disc, and by a fly wheel 24 that bears against the top of the disc at a position opposite the drive roller. A motor 26 drives the drive roller 22. A bearing 28 which is urged upwardly by a spring (not shown) supports the drive roller 22 while urging it upwardly against the disc. A central stationary shaft or spindle 27 which projects through a hole 29 in the disc, keeps the disc centered on a fixed axis of rotation.

If a plastic disc is rotated on a stationary plate, it is found that the disc develops a charge, or static electricity, which causes it to be attracted to the stationary plate against which it rubs. This attraction increases the drag on the disc so that it is harder to rotate and, under some conditions, the disc locks to the plate and cannot be driven without damage to it. In order to reduce such drag, the plate 18 is provided with protuberances 30 that project above the upper surface of the rest of the plate. The protuberances are rounded at their tops so that there is only a very small upper surface of the plate which actually contracts or is very close (within a few thousandths of an inch) to the lower disc surface. The protuberances 30 are arranged along two imaginary circles 32, 34 that are concentric with the axis of rotation of the disc 10. The radii $R_1$ and $R_2$ are chosen so that the disc is stably supported.

The protuberances 30 help to reduce drag in several ways. According to theory, static electricity builds up on a plastic disc as it is rubbed by reason of electrons being knocked off of the surface of the plastic disc. The fact that the protuberances define only narrow rings on the disc (at the radii $R_1$ and $R_2$) where the disc is rubbed, limits the amount of disc surface that is rubbed and therefore minimizes the total charge that is generated. Of course, the smaller area creates a higher localized pressure which may increase the local charge, but the level to which charge can build up is limited because build up is reduced as the available electrons are removed or as charge leaks off. The reduced total amount of charge build up on the disc reduces the drag of the disc on the plate 18.

Another way in which the protuberances 30 serve to reduce drag result from the fact that even along the circles of radius $R_1$ and $R_2$, there is only a small area in contact or very close to the disc. The drag caused by charge build up decreases greatly as the distance increases between the charged area of the disc and the region of the plate below it which it attracts, so there is appreciable drag interaction only between those regions on the disc which are touching or very close to the top of a protuberance. As a result, there is only a small area over which there is a strong static electricity attraction and drag is limited.

The small area at the top of the protuberances, which contacts the disc, leaves an appreciable open area, which is occupied by air through which static charges can dissipate. Thus, in addition to the small region over which static charges can build up on the disc and the small area where the disc can strongly attract the plate, dissipation of charge on the disc is promoted to further reduce drag caused by static electricity.

The plate 18 is preferably made of a material which is a good electrical conductor, such as sheet steel, so that charges produced on the protuberances are conducted away or widely distributed. The protuberances 30 can be readily formed by coining bumps into the sheet. Such a coining operation readily produces a very smooth surface at the top of the protuberance, which is smoother than the parent sheet. The smoother upper surfaces of the protuberances results in less mechanical wear on the protuberances or optical disc. The area at the top of the protuberances which is directly in contact with the disc, may be on the order of 1/100th of 1 percent of the total area of the disc, and yet the disc is supported adequately. The fact the projections are located along concentric circular paths means that whatever wear there is on the disc is concentrated along narrow ring-shaped paths. In order to prevent noise resulting from scratches at these paths, the disc is constructed so that there is no optical tracks at the radii $R_1$ or $R_2$ on the disc, and there is no photocells on the mechanism to detect light shining through these areas.

The protuberances can be formed in a variety of patterns to support the disc. However, it is preferable to construct the protuberances so that the upper surface of the plate has an area substantially less than half the area on the underface of the disc in order to substantially reduce drag, the area of the protuberances preferably being only a fraction of one percent of the area under the disc. The protuberances can be arranged in any pattern, but they preferably are arranged in no more than several (i.e., no more than about seven) concentric circles about the axis of rotation of the disc. Generally, no more than about three concentric circles of protuberances is adequate to support even a very thin optical disc without substantial bending, and in some cases a single circle of protuberances is sufficient. For example, if a small rotating hub is used to support the center of a disc, and the disc has substantial stiffness, then a single circle of protuberances near the periphery of the disc may be sufficient. The disc-supporting plate member 18, which serves as a bearing means for the disc, can be supported on springs that allow some movement, but it should remain substantially stationary as the disc rotates on it.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. Disc driving apparatus comprising:

housing means;

electrically conductive slider bearing means mounted on said housing means and having a plurality of stationary protuberances spaced from each other about a circle, for supporting a disc; and means for rotating a disc on said bearing means so it rotates relative to said bearing means about an axis concentric with said circle about which said protuberances are arranged.

2. The apparatus described in claim 1 wherein said bearing means comprises a sheet of electrically conductive material with rounded protuberances formed therein.

3. The disc driving apparatus described in claim 1 wherein said bearing means includes a second plurality of protuberances spaced from each other along a second circle which is concentric with said first named circle.

4. An optical disc playing machine comprising:

a housing;

a disc supporting member mounted on said housing to remain substantially stationary thereon, said member having a plurality of rounded protuberances on its upper surface for slideably supporting an optical disc;

light source means and photodetector means mounted on said housing on opposite sides of the position of a disc on said disc supporting member; and means for rotating a disc on said disc supporting member.

5. The optical disc playing machine described in claim 4 wherein:

said disc-supporting member is constructed of electrically conductive material.

6. The optical disc playing machine described in claim 4 wherein:

said disc-supporting member comprises a plate of electrically conductive material having indentations in its upper surface of a form having rounded tops that form said protuberances.

* * * * *